Figure 1:
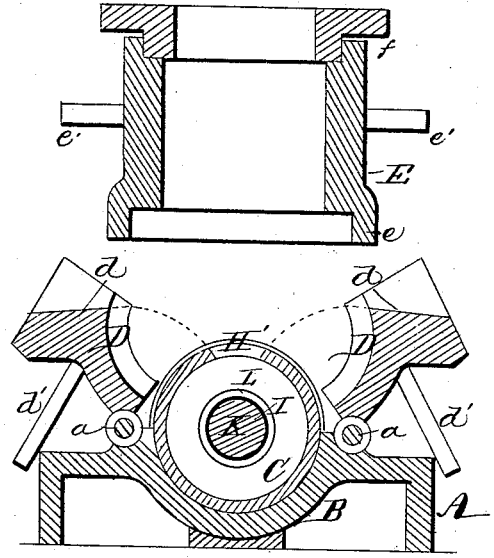

(No Model.) 2 Sheets—Sheet 1.

J. H. CROSKEY & J. LOCKE.
METHOD OF MAKING UNDERGROUND CONDUCTORS.

No. 568,298. Patented Sept. 22, 1896.

Witnesses:
J. O. McGin.
W. Darrell.

Inventors:
John H. Croskey
and Joseph Locke
by Connolly Bros.
Attys.

(No Model.) 2 Sheets—Sheet 2.

J. H. CROSKEY & J. LOCKE.
METHOD OF MAKING UNDERGROUND CONDUCTORS.

No. 568,298. Patented Sept. 22, 1896.

Witnesses:
J. B. McGirr.
W. Darrah.

Inventors:
John H. Croskey
and Joseph Locke
by Connolly Bros.
Attys

THE NORRIS PETERS CO., PHOTO-LITHO., WASHINGTON, D. C.

UNITED STATES PATENT OFFICE.

JOHN H. CROSKEY AND JOSEPH LOCKE, OF PITTSBURG, PENNSYLVANIA.

METHOD OF MAKING UNDERGROUND CONDUCTORS.

SPECIFICATION forming part of Letters Patent No. 568,298, dated September 22, 1896.

Application filed May 21, 1896. Serial No. 592,499. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Underground Conductors for Electricity and Methods of Making the Same; and we do hereby declare the following to be a full, clear, and exact description of the invention, such as will enable others skilled in the art to which it appertains to make and use the same.

Our invention has relation to underground conductors for electricity and methods of making the same, and has for its object the provision of a novel conductor and method of manufacturing the same, the conductor comprising an exterior metallic envelop, cover, or casing, an inclosed mass of glass having a longitudinal bore or passage, or a plurality of such bores or passages, and a non-adherent metallic conductor or conductors passing loosely through the glass, and the novel method of manufacturing the same, consisting in forcing molten glass into a metallic casing or cover and around a suitable core or cores sustained therein, then allowing the glass to harden, and, finally, passing a suitable metallic conductor through the passage or bore produced by the core.

In carrying our invention into effect we preferably prepare a core of suitable size and arrange the same within a metallic casing, then force molten glass into the space between the core and casing, and after the glass has hardened we remove the core, or such portion of the same as may be necessary, and pass a metallic conductor through the space left vacant by the removal of the core. The core which we employ to form the passage or bore in the glass may be either a mandrel or core-bar coated or covered with a suitable material, or where large passages or bores are to be formed in the glass, and where the core is large enough to be self-sustaining, the central core-bar or mandrel may be dispensed with. The coating or covering of the mandrel or core-bar, which, together with the mandrel or core-bar when the same is employed, constitutes the core proper, may be either a material which will adhere to the glass and remain within the same when the mandrel or core-bar is removed, or it may be of such character that after the glass has hardened it may be removed so as to leave a clean and clear passage or bore through the glass, and when a simple core without a central mandrel or core-bar is employed the core may be of such material that it will be easily disintegrated and removed from the glass, or it may be made of a material which will remain intact within the glass, the core in the latter case being formed previously to its introduction into the cover or casing with a passage or bore for the reception of the metallic conductor which is to be subsequently passed through such passage or bore.

While we have shown in the drawings a conductor or conduit formed by pressing glass around one core, and hence having but one central bore or passage, we wish it to be understood that a plurality of cores may be employed when it is desired to make a compound conductor or conduit with a plurality of independent conducting wires or cables.

Figure 2:
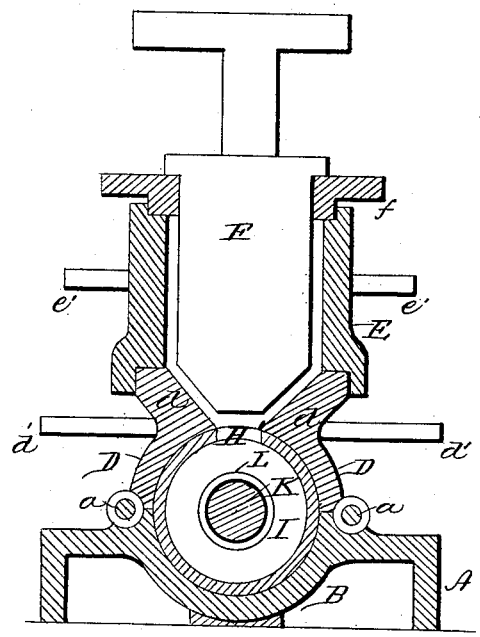
Figure 3:
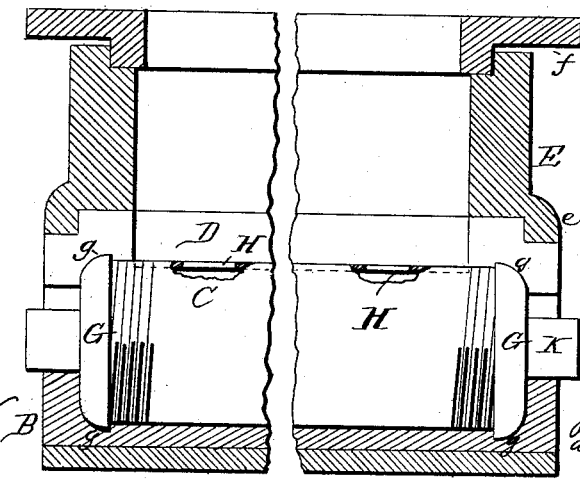
Figure 4:
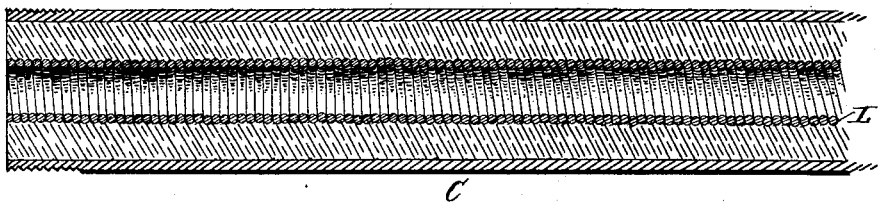
Figure 5:
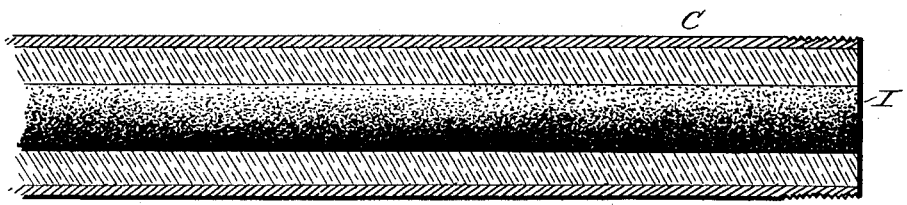
Figure 6:
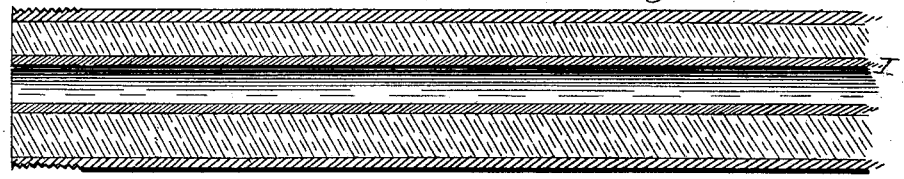

Referring to the accompanying drawings, Figure 1 is a vertical transverse sectional view of a glass mold and pressing apparatus adapted for carrying our method into effect, the exterior casing of the conductor and the core being shown in position therein and the mold being opened. Fig. 2 is a similar view showing the mold closed. Fig. 3 is a vertical longitudinal sectional view of the same. Fig. 4 is a sectional view of a section of the conductor after the removal of the mandrel or core-bar from the core; Fig. 5, a similar view with a solid inclosed core without a mandrel, before the removal of the core; Fig. 6, a similar view with a hollow core, and Fig. 7 a sectional view of the complete conductor comprising a number of sections such as are shown in Fig. 4 joined together and with a metallic conductor passing through the bore or passage in the glass.

The apparatus shown in Figs. 1, 2, and 3 consists of a mold adapted to contain a section of iron pipe, in which the core which is to form the bore or passage in the glass is temporarily sustained by removable caps screwing on the screw-threaded ends of the pipe, a fount fitting on top of the mold and a plunger to press the glass from the fount into the glass and around the cores.

A designates the base of the mold, having a semicircular recess B, adapted to receive a section C of pipe and provided with hinge members a a, to which are hinged similar members on the upper hinged sections D D of the mold. These upper sections are in shape segments of circles and are formed with tangentially-projecting wings d d, which form a mouth for the mold when the sections are closed and a seat for the fount E. This fount E is quadrangular in plan view and rests upon top of the sections D D and is formed with a depending flange e, that embraces the edges of the sections D D and holds them together when closed. A plunger F passes through the plate or cap f, that rests on top of the fount, and which may be a spring-plate such as is ordinarily used in press-molds.

The base A of the mold and the sections D D are cut out near each end so as to form grooves g g, which receive caps G G, that are fitted on the screw-threaded ends of the pipe-section C and have holes through which pass the ends of the core I.

The pipe-section C is formed with a number of holes H H on top to allow the glass to pass down from the fount into the pipe.

The sections D D are provided with handles d' d' and the fount E with handles e' e', by means of which these parts are manipulated.

Figure 7:
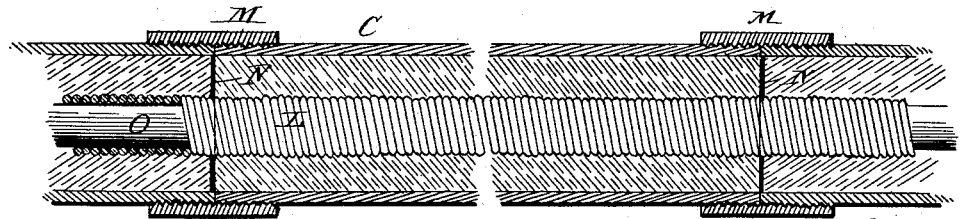

In operating the above-described apparatus the caps G G are placed on the pipe-section C and the core I placed in position, passing through the holes in the caps. The pipe-section is then laid in the base A of the mold, the sections D D are closed over it, and the fount E placed in position on top of the mold, the depending flange e serving to keep the sections tightly closed. A mass of molten glass is then placed in the fount and is pressed therefrom down into the pipe-section C, completely filling the same and embedding the core I in a solid mass of glass. The core which we prefer to employ is that shown in Figs. 1, 2, 3, and 4, which is made in the following manner: We take a mandrel or core-bar K and lightly coat it with a mixture of asphalt or similar hydrocarbon and powdered plumbago and we then wrap tightly upon the mandrel or core-bar a quantity of asbestos or other suitable mineral substance L. After the mandrel or core-bar has been coated as described we heat the coating, so as to expel all the vaporizable constituents of the coating. We then insert the core in the pipe C, the ends of the core passing into or through the caps G G, and having placed the pipe in the recess B of the mold close the mold, place the fount in position, fill it with molten glass, and then by means of plunger F force the glass through the holes H' H' in the pipe and thus completely inclose the core in the hot soft glass. After the glass has hardened to a sufficient degree we remove the pipe and then draw out the mandrel or core-bar, the coating of asphalt and plumbago having been converted into a porous and easily-disintegratable mass by the preliminary devaporizing heating and the heat of the molten glass. The removal of the mandrel or core-bar leaves the asbestos covering of the core embedded in the glass in the section of pipe as shown in Fig. 4, and the complete underground conductor is constructed by joining together a number of sections shown in Fig. 4 by means of unions M and interposed packing N and threading through the central bore or passage a metallic wire or cable O.

Where the solid core shown in Fig. 5 is employed, the core should be composed of a material which will be easily removed from the glass, such as the mixture of asphalt and plumbago before referred to, which should be heated so as to expel all vaporizable elements and leave a dry porous carbonaceous mass before being put in place in the pipe. After the glass has been forced into the pipe and around the core shown in Fig. 5 and after the glass has hardened the entire core or the center of the same may be readily shaken out or broken out with a suitable tool and the sections of pipe joined together and a wire or cable drawn through the central orifice, forming substantially the same insulated conductor as is shown in Fig. 7.

The hollow core shown in Fig. 6 may be made of any suitable material, such as baked clay or a mixture of clay and asbestos, or asbestos alone, or of any other suitable material which will withstand contact of the molten glass, care being taken that whatever material is employed the core is devoid of vaporizable elements when subject to contact with the molten glass.

Where the core shown in Fig. 6 is employed, the hollow within the core will serve as the bore or passage to admit the wire or cable, and hence the core need not be removed from the glass, but may remain embedded or closely embraced by the same.

Having described our invention, we claim—

1. The method of making underground conductors for electricity consisting in forcing molten glass into an envelop cover or casing and around a core having a central core-bar or mandrel, then removing the core-bar or mandrel and inserting a metallic conductor into the passage or bore formed by the removal of the mandrel, substantially as described.

2. The method of making underground conductors for electricity consisting in forming a section of conduit by casting molten glass into an envelop, cover or casing and around a core sustained therein, then removing sufficient of the core to form a passage or bore of the required size, then joining a number of the sections together and finally passing a metallic conductor through the passages in the several sections, substantially as described.

3. The method of forming sections of underground conduits for conductors of electricity consisting in forming a core by coating a mandrel or core-bar with a non-metallic mineral then inserting the core in an envelop cover or casing then surrounding the core with molten glass and then removing the mandrel or core-bar, substantially as described.

4. The method of forming sections of underground conduits for conductors of electricity consisting in forming a core by coating a mandrel or core-bar with an adhesive mixture, then coating it with a substantially incombustible mineral substance, then heating the core to remove the vaporizable constituents, then inserting the core in an envelop, cover or casing, then filling the space between the core and casing with molten glass and finally removing the mandrel or core-bar, substantially as described.

5. An underground conductor for electricity consisting of a series of connected sections each comprising a metallic envelop cover or casing, a filling of solid glass and a hollow core embedded in the glass, the connected sections having a continuous metallic conductor passed loosely through the passages or bores in their cores, substantially as described.

6. The method of manufacturing underground conduits which consists in arranging a core in an envelop, cover or casing, filling the space between the core and casing with glass and then removing so much of said core as may be required to form a bore or passage of the desired size.

7. As a new article a section of conduit comprising an envelop, cover or casing and a lining of glass molded into the casing and around a core sustained therein substantially as described.

In testimony whereof we have affixed our signatures in presence of two witnesses.

JOHN H. CROSKEY.
              JOSEPH LOCKE.

Witnesses:
  ALBERT J. HENNING,
  PETER SHIELDS.